US012314569B2

(12) United States Patent
Agarwal et al.

(10) Patent No.: US 12,314,569 B2
(45) Date of Patent: May 27, 2025

(54) STREAM DATA MANAGEMENT IN STORAGE DEVICE USING DEFRAGMENTATION

(71) Applicant: Western Digital Technologies, Inc., San Jose, CA (US)

(72) Inventors: Leeladhar Agarwal, Fremont, CA (US); Dhanunjaya Rao Gorrle, Fremont, CA (US); Iva Majeticova, Superior, CO (US)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/352,964

(22) Filed: Jul. 14, 2023

(65) Prior Publication Data

US 2024/0201859 A1 Jun. 20, 2024

Related U.S. Application Data

(60) Provisional application No. 63/432,675, filed on Dec. 14, 2022.

(51) Int. Cl.
*G06F 3/06* (2006.01)
(52) U.S. Cl.
CPC .......... *G06F 3/0613* (2013.01); *G06F 3/0659* (2013.01); *G06F 3/0679* (2013.01)
(58) Field of Classification Search
CPC ..... G06F 3/0613; G06F 3/0659; G06F 3/0679
USPC ........................................................ 711/154
See application file for complete search history.

(56) References Cited

U.S. PATENT DOCUMENTS

| | | | |
|---|---|---|---|
| 7,366,826 B2 | 4/2008 | Gorobets et al. | |
| 9,477,590 B2 | 10/2016 | Post et al. | |
| 9,886,383 B2 | 2/2018 | Cohen et al. | |
| 11,042,323 B2 | 6/2021 | Li et al. | |
| 11,262,928 B2 | 3/2022 | Muthiah | |
| 2019/0050327 A1* | 2/2019 | Li | G06F 3/0626 |
| 2021/0064526 A1* | 3/2021 | Palmer | G06F 3/0656 |
| 2021/0223979 A1* | 7/2021 | Li | G06F 3/064 |
| 2022/0405001 A1* | 12/2022 | Xie | G06F 3/064 |
| 2023/0051212 A1* | 2/2023 | Parry | G06F 12/0253 |

FOREIGN PATENT DOCUMENTS

WO 2007073536 A2 6/2007

\* cited by examiner

*Primary Examiner* — Than Nguyen
(74) *Attorney, Agent, or Firm* — Morgan, Lewis & Bockius LLP

(57) ABSTRACT

A controller of a storage device receives a stream of data from a host system. The stream of data corresponds to logical block addresses. The controller writes the stream of data to data block(s) in a device memory, each data block including respective super word line(s), each super word line including respective word line(s), and each word line corresponding to at least one logical block address. The controller generates a table for storing the logical block addresses in the order of data arrival. In response to receiving an update to one or more logical block addresses of the data block(s), the controller defragments at least one data block, based on the one or more logical block addresses, and writes data for one or more super word lines of the at least one data block to a new data block, based on the table, to retain the order.

18 Claims, 7 Drawing Sheets

STREAM DATA MANAGEMENT IN STORAGE DEVICE USING DEFRAGMENTATION

CROSS-REFERENCE TO RELATED APPLICATION

This application claims the benefit of U.S. Provisional Application No. 63/432,675, filed on Dec. 14, 2022, the entirety of which is incorporated herein by reference for all purposes.

BACKGROUND

A storage system can be used to store data from a host. The host can request that the storage system store the data in a logical address, and the storage system can maintain a logical-to-physical address table to correlate logical and physical addresses. The storage system can implement data management algorithms, which can move the data to a different physical address than the one in which the data was initially stored. This can result in fragmentation of the memory.

For a sequential stream, the logical space assigned by the file system may be fragmented, even though at the time of initial host write, the device routed the stream data to a dedicated sequential block. At a later point in time, if any update occurs, the controller of the storage device has no knowledge in what order the data needs to be rearranged for best streaming performance. For example, for a sequential stream, such as a game, a game update may involve read-modify-write (RMW) operations, which may be a blocking operation and also cause significant write amplification.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

Figure 1:
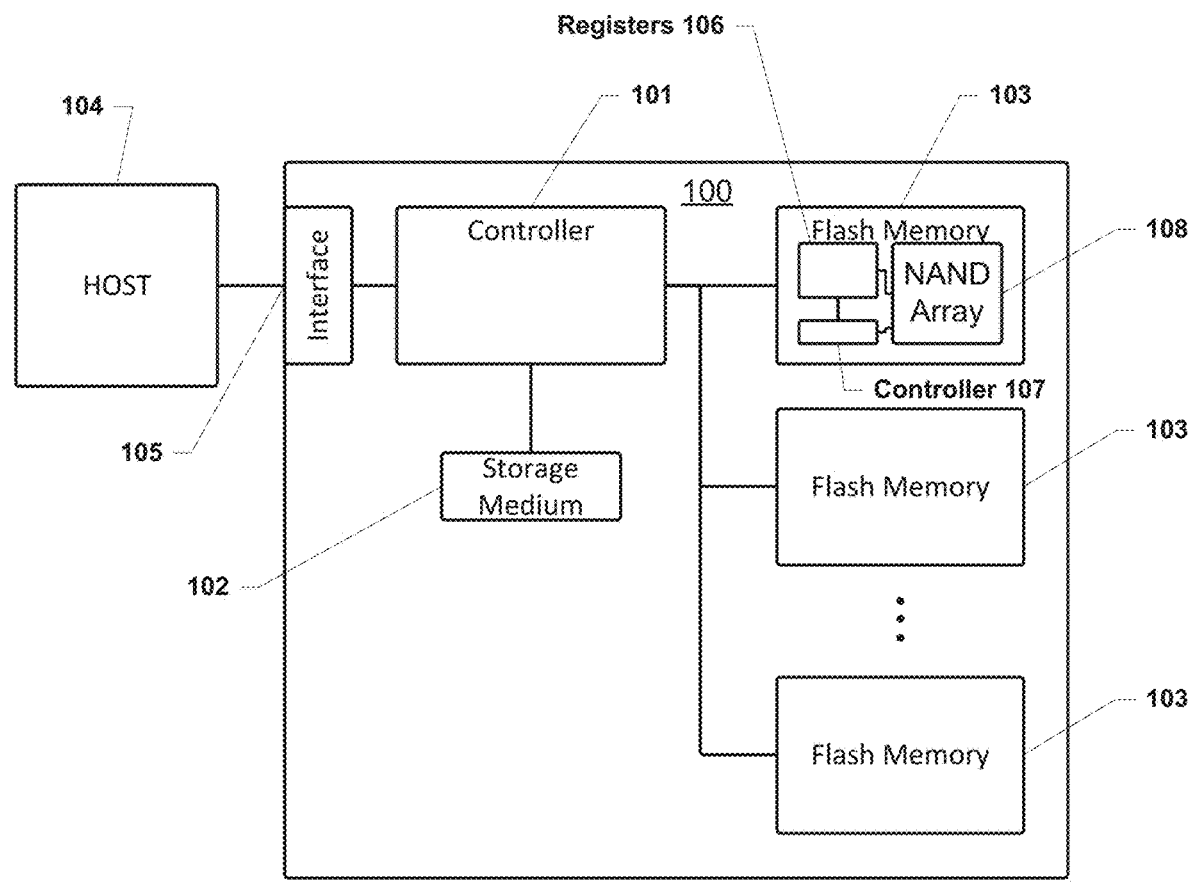
FIG. 1 is a block diagram illustrating components of an example data storage system, according to one or more embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems and methods, and more particularly to, for example, without limitation, providing efficient stream data management in a data storage device.

A method is provided for tracking the order of data writes for better streaming performance and also for reducing impact on write amplification. For case of explanation, the description herein uses a game download and/or a game update as an example, but the techniques described herein may apply to any similar streaming application. In some aspects, each game region download is considered a stream and may be written to a sequential data block irrespective of the logical block address (LBA) assigned to the game region. For a given stream, the device may maintain a stream LBA table (SLT) to bookkeep the LBA order written by the host at the time of writing a sequential stream (e.g., at the time of game download). After the completion of the game download, if any patch update or game update is performed by the host or if an LBA is invalidated using an un-map or deallocation request, then after the update is completed, the device may be configured to defragment the game data and write back the data in the same order as in the SLT. Based on the number of the fragments and/or a number of updated word lines in a game container, the device may be configured to determine whether to perform a complete fragmentation or an intelligent defragmentation. For example, a fragmentation evaluation across all dies may be performed at a word line granularity to determine the minimum amount of defragmentation required, instead of rewriting the full game. In some aspects, the device may be further configured to evaluate the performance impact due to the fragments and if the performance impact is minimal, the device may be configured to skip the defragmentation operation.

For game play or file access, data may be read in the same order as it was written, so some aspects define the sequential stream using the LBA order in which data is written. Each game region download may be considered a stream and may be written to the sequential data block irrespective of the LBA assigned to the game region. Streaming is most common for game play. After a game download or game update, game developers typically perform read modified write for the full game to ensure the full game is written sequentially on the device. In some aspects, game developers push for game updates and a user controls the updates to the drive based on operating system notifications, similar to smart phone updates. After a user accepts an update, the drive handles it as a read-modify-write. In some aspects, a host initiates a full game read-modified-write. Read modified write time may incur significant cost and may depend on game size. Typically, the operation is performed during idle time. Otherwise, the operation may block the user from playing the game. The operation may also cause significant write impact on the device to write amplification. Estimates show that, using the techniques described herein, for the gaming world, the device writes amplification can be improved by 30%, and the device may support up to an additional 30% target total bytes written. Moreover, the storage device can be designed with less NAND target program/erase cycle, so NAND trim can be optimized for faster performance.

FIG. 1 is a block diagram illustrating components of an example data storage system, according to aspects of the subject technology. A data storage system may be sometimes referred to as a system, a data storage device, a storage device, or a device. As depicted in FIG. 1, in some aspects, a data storage system 100 (e.g., a solid-state drive (SSD)) includes a data storage controller 101, a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. The processor may be a microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAMs may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fibre channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101. The host interface 105 (or a front end of the controller 101) may include a submission queue 110 to receive commands from the host device 104. For input-output (I/O), the host device 104 may send commands, which may be received by the submission queue 110 (e.g., a fixed size circular buffer space). In some aspects, the submission queue may be in the controller 101. In some aspects, the host device 104 may have a submission queue. The host device 104 may trigger a doorbell register when commands are ready to be executed. The controller 101 may then pick up entries from the submission queue in the order the commands are received, or in an order of priority.

The flash memory 103 may represent a non-volatile memory device for storing data. According to aspects of the subject technology, the flash memory 103 includes, for example, a not-and (NAND) flash memory. The flash memory 503 may include a single flash memory device or chip, or (as depicted in FIG. 1) may include multiple flash memory devices or chips arranged in multiple channels. The flash memory 103 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 101 may perform the operations identified in blocks 702-714. The controller 101 may cause the operations identified in blocks 702-714 to occur, or the controller 101 may provide instructions to cause or facilitate the controller 107 (and the registers 106) to perform operations identified in blocks 702-714.

Figure 2:
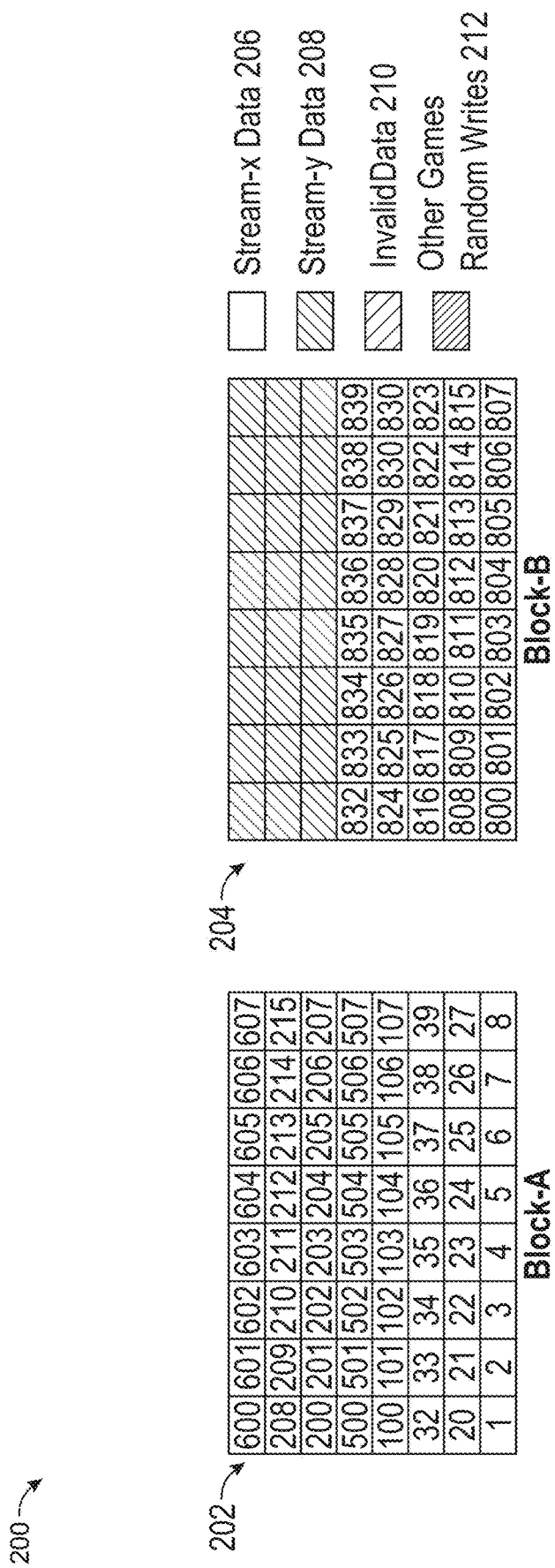
FIG. 2 is a schematic diagram of an example memory layout, according to one or more embodiments.

FIG. 2 is a schematic diagram of an example memory layout 200, according to one or more embodiments. The example shows two data blocks, block A (labelled 202) and block B (labelled 204). Two data streams, stream X data 206 and stream Y data 208, are written to block A and block B. In this example, there is no invalid data 210, and no other random writes for other games 212. The two data streams stream X and stream Y may each correspond to a different game download. The game download for stream X includes a number of logical block addresses (LBAs). Each row in the block A or block B can be thought of as a super word line, each entry in each row corresponds to a word line that in turn corresponds to one or more LBAs. For example, a first super word line in the block A includes the LBAs 1 to 8, a second super word line in block A includes the LBAs 20 to 27, and so on. A stream write may include non-contiguous LBAs, as shown in FIG. 2. A stream write may continue from one data block (e.g., block A) to a second block (e.g., block B) and so on. Typically, a game download is written to consecutive of a super word line, then to subsequent word lines in a similar fashion, then to super word lines in a different block, until the download is complete. Subsequently, a different game may be downloaded, and so on. It is noted that each super word line may be a combination of physical word lines from different dies, for parallelism, and each physical word line may hold multiple LBAs, typically 8 LBAs.

Figure 3:
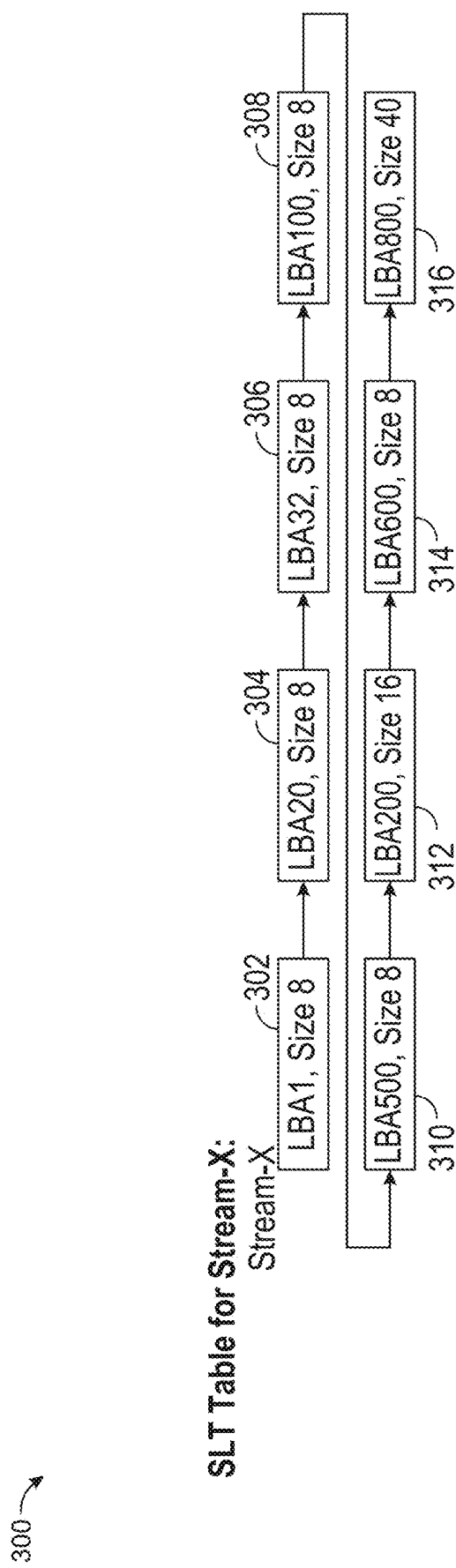
FIG. 3 is a schematic diagram of an example stream LBA table (SLT), according to one or more embodiments.

FIG. 3 is a schematic diagram of an example stream LBA table (SLT) 300, according to one or more embodiments. The example shows an SLT table for stream X shown in FIG. 3. In this example, there is an entry 302 for LBA 1, with a size 8 (number of contiguous LBAs starting with LBA 1), an entry 304 for LBA 20, with a size 8, an entry 306 for LBA 32, with a size 8, an entry 308 for LBA 100, with a size 8, an entry 310 for LBA 500, with a size 8, an entry 312 for LBA 200, with a size 16, an entry 314 for LBA 600, with a size 8, and an entry 314 for LBA 800, with a size 40. Other configurations are possible, but the one shown seems to efficiently represent the organization or order of the writes of the LBAs. Consecutive LBAs need to be represented using only one entry, and the size indicates each run of LBAs, storing all the LBAs effectively in a compressed manner. Although the table is shown as a linked list (connected list of entries), other data structures (e.g., a table, a tree) may be used for organizing the entries for effective search operations, further depending on size of the blocks, the number of super word lines in a block, the number of word lines in a super word line, a typical or average number of LBAs for game downloads or streams, and so on, for effectively managing the streams. The start of the table (e.g., the entry 302) is available for the controller 101 for easy access to information on LBAs written for a stream.

Figure 4:
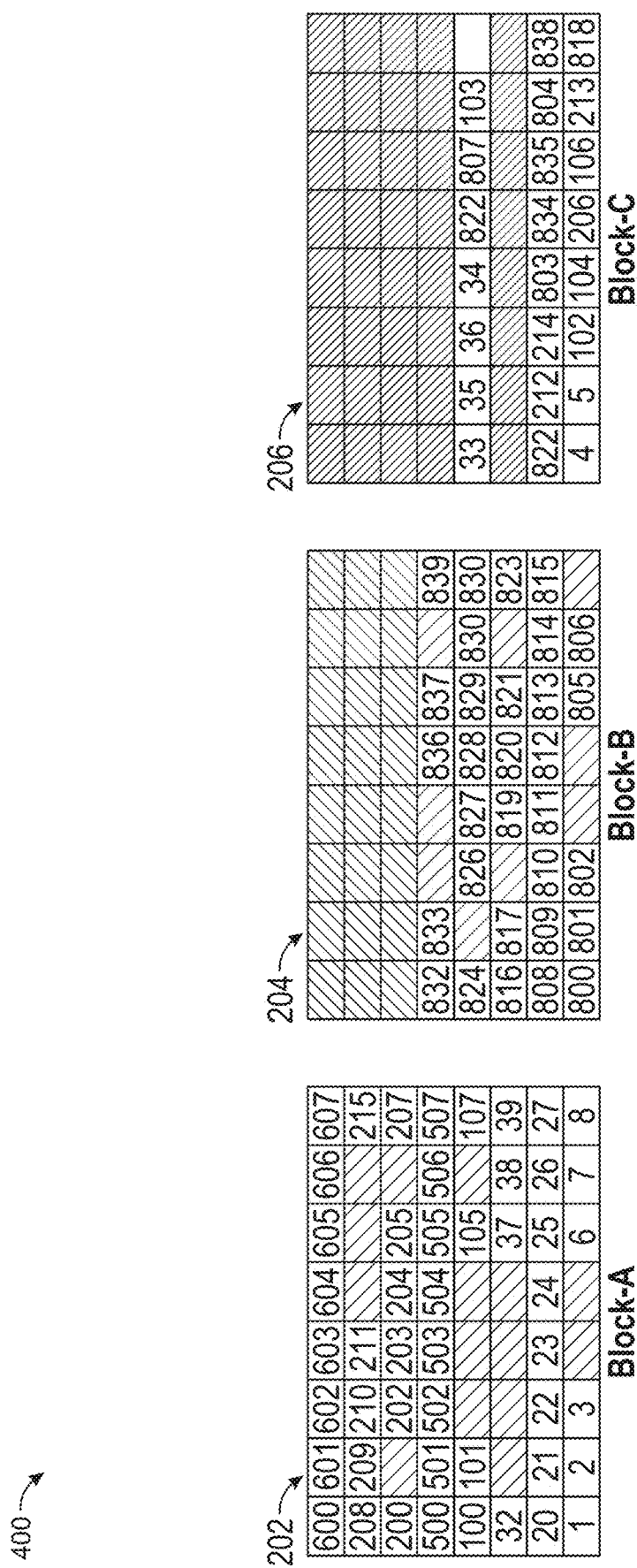
FIG. 4 is a schematic diagram of an example memory layout after invalidation, according to one or more embodiments.

FIG. 4 is a schematic diagram of an example memory layout 400 after invalidation, according to one or more embodiments. In this example, several logical block addresses have invalid data (pattern 210). This may correspond to a game update for the stream X data. Data corresponding to LBAs 4, 5, 102, 104, 206, 106, 218, 818, etc. are shown having been written to a block C (labelled 206), are therefore invalidated in block A and block B. The updates need not occur in the order of the LBAs in block A and block B. For example, after writing data corresponding to LBAs 4 and 5, the game update switched to data corresponding to LBAs 102, 104, etc. before returning to data corresponding to LBAs 33, 35, 36, etc. In other words, the updates may occur in any order of LBAs, any order of super word lines, or any order of data blocks (e.g., the update may switch from block A to block B, and back to block A). The example also shows data due to random writes corresponding to other games (shown using pattern 212) intervening the writes or updates for stream X.

Figure 5:
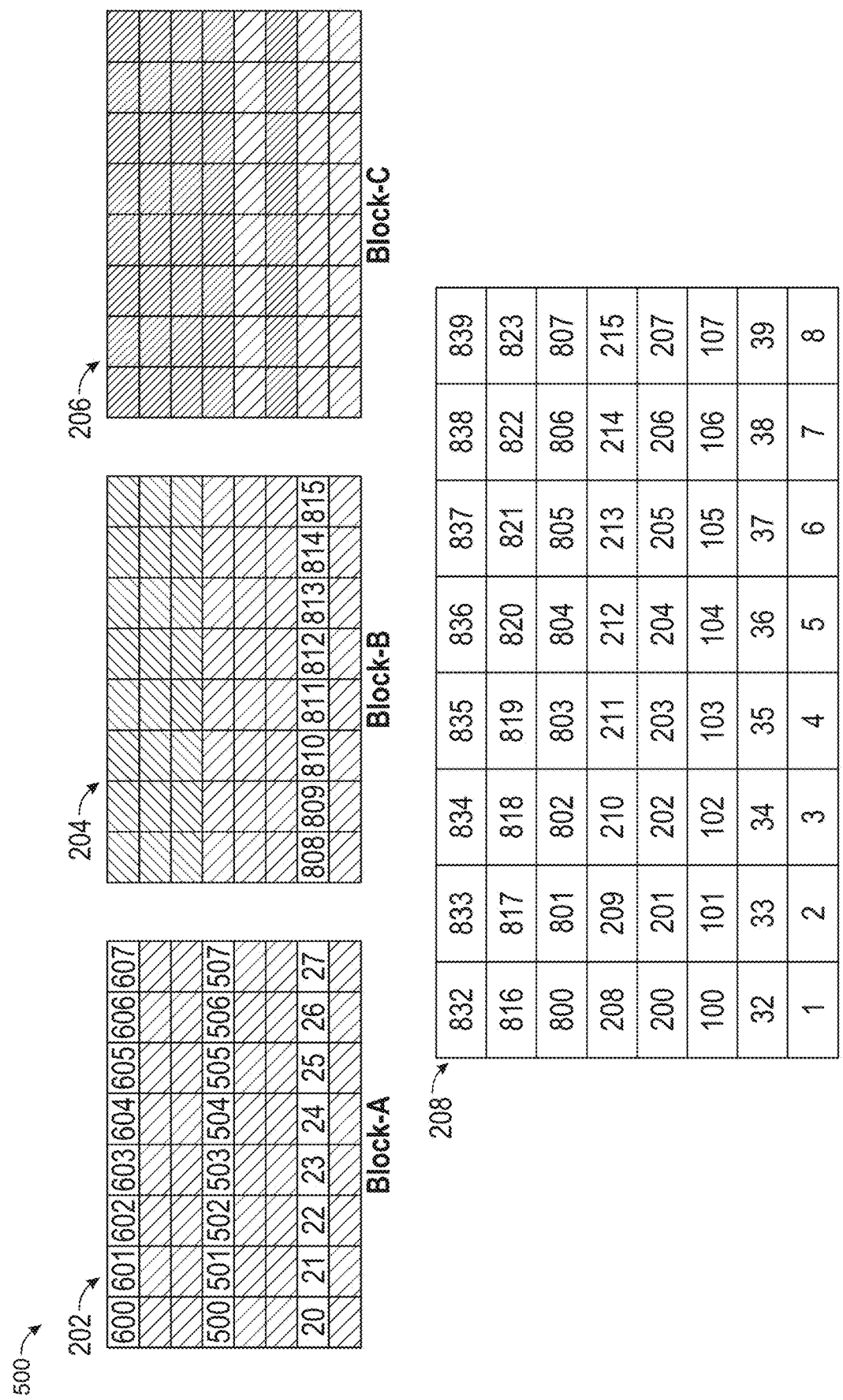
FIG. 5 is a schematic diagram of an example memory layout after defragmentation and writing data, according to one or more embodiments.

FIG. 5 is a schematic diagram of an example memory layout 500 after defragmentation and writing data, according to one or more embodiments. In this example, super word lines that included LBAs that were invalidated by a prior game update are shown copied from block A, block B and block C to a new block D (labelled 208). To do the copying, the controller 101 may use the SLT for stream X shown in FIG. 2 as follows. Because the first entry in the SLT 300 indicates LBA 1 with size 8, data corresponding to 8 LBAs starting at LBA 1 are written to a first super word line in block D, based on data in blocks A and block C. After completing the first super word line, the controller 101 moves to the next set of LBAs in block D. for LBAs 32 through 39, then the row or the super word line for LBAs 100 to 107, and so on. Note that some copies can include multiple super word lines (e.g., the string of LBAs starting at 200 include two super word lines, because it is size 16). This process is repeated until all relevant super word lines are copied over to block D. In some aspects, the controller 101 may use a stream identifier to determine that data is distributed between two blocks (e.g., block A and block C), and where to retrieve corresponding data for LBAs. In some aspects, the controller 101 may maintain a mapping (e.g., a flash translation layer (FTL) table) which provides LBA to physical/super block addressing so that the controller can determine where data can be copied from.

Based on the number of the fragments and/or a number of updated LBAs in a game container, the storage device may decide to perform complete fragmentation or intelligent defragmentation. The device may evaluate performance impact due to fragments and if performance impact is minimal, the device can skip defragmentation. In some aspects, the controller 101 may determine a performance impact based on the fragmentation of data layout for an LBA range. Typically, sequential read yields best performance as all the dies or channels are utilized equally. But due to fragmentation of the data, if the same sequential read becomes random read due to fragmentation, performance may be reduced.

Figure 6:
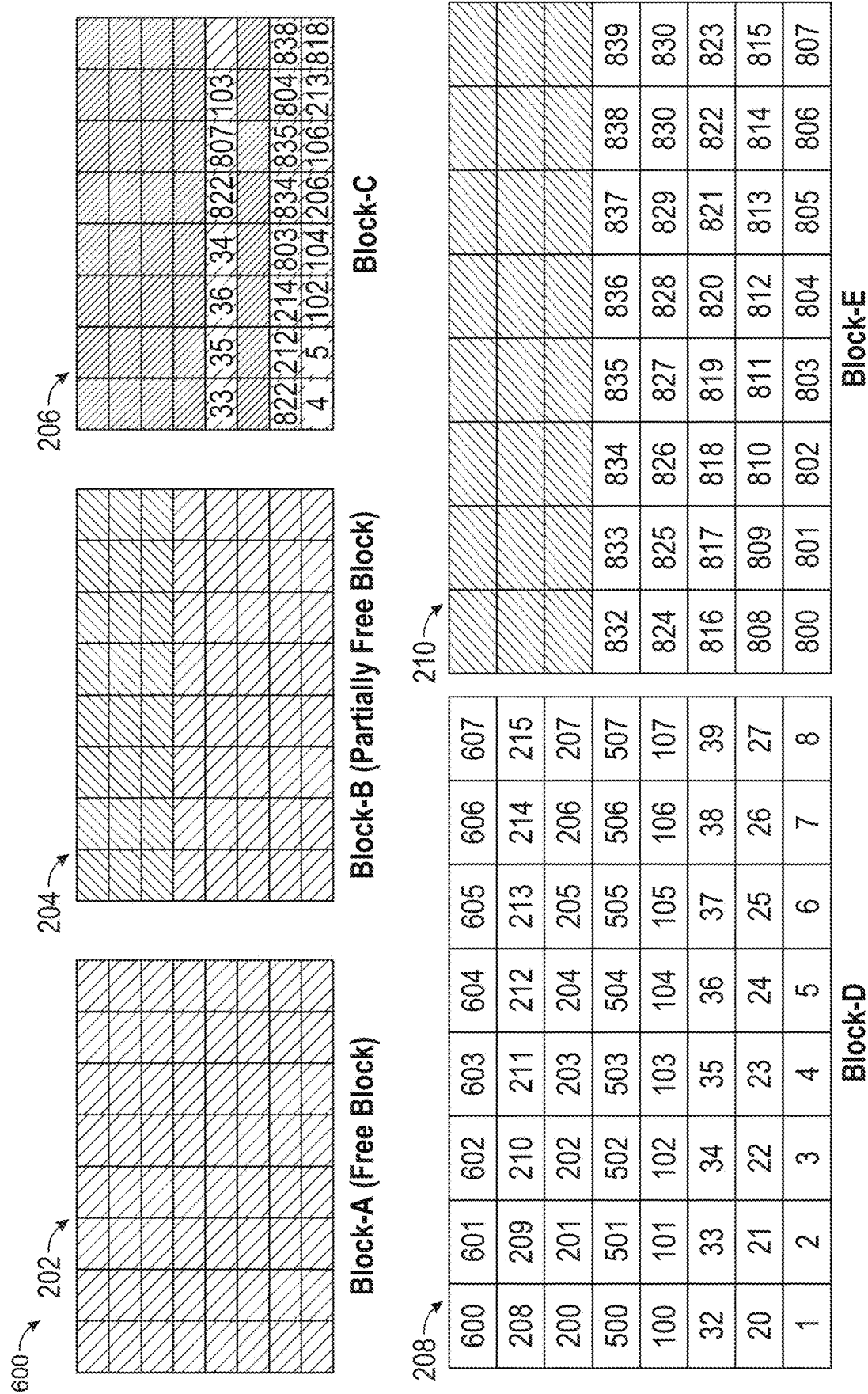
FIG. 6 is a schematic diagram of an example memory layout after a full
defragmentation, according to one or more embodiments.

FIG. 6 is a schematic diagram of an example memory layout 600 after a full defragmentation, according to one or more embodiments. In this example, the controller 101 has determined that it is better to perform full defragmentation, completely move data from block A and block B over to blocks D and block E (labelled 210). The copies to blocks A and B are unlike the example described above in reference to FIG. 5. Here, data for all the super word lines in blocks A and B are copied over to blocks D and E, thereby completely freeing block A and partially freeing block B. Some data is still left in block C, but at least blocks A and B are freed from use for the stream X. A new game may be written to those data blocks now, or it may be used for another application. When the amount of fragmentation crosses a threshold, from an efficiency point of view, full defragmentation may be preferred. Full defragmentation may copy data from one block to another, instead of having to determine a tradeoff between performance (e.g., drop in performance due to fragmentation) versus time taken for copying.

Figure 7:
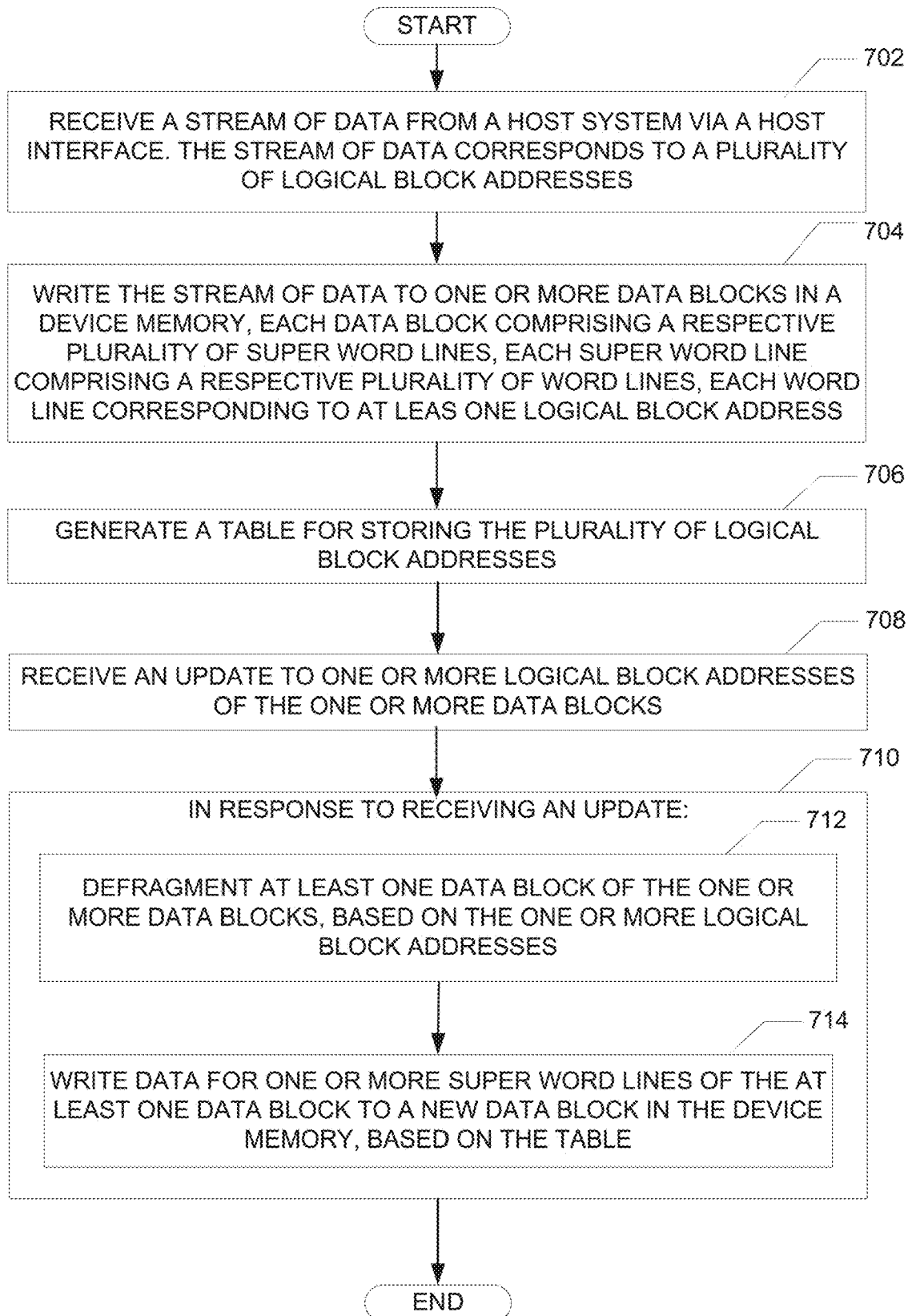
FIG. 7 is a flowchart illustrating an example process for stream data management in a storage device, according to one or more embodiments.

It may be instructive to describe the structures shown in FIGS. 1, 2, 3, 4, 5, and 6, with respect to FIG. 7, a flowchart illustrating an example process 700 for stream data management in a storage device, according to one or more embodiments. One or more blocks of FIG. 7 may be executed by a computing system (including, e.g., a controller of a flash memory, a data storage controller of a data storage system or a solid state storage device (SSD), a processor, or the like). Example of a computing system or a controller may be the controller 101. Similarly, a non-transitory machine-readable medium may include machine-executable instructions thereon that, when executed by a computer or machine, perform the blocks of FIG. 7. The steps of process 700 may be implemented as hardware, firmware, software, or a combination thereof. For example, a data storage device (e.g., the storage device 100) includes a submission queue for receiving host commands from a host system. The data storage device also includes a controller (e.g., the controller 101).

The controller 101 may be configured to receive (702) a stream of data from the host system via the host interface. The stream of data corresponds to a plurality of logical block addresses. The controller 101 may be configured to write (704) the stream of data to one or more data blocks in the device memory. Each data block may include a respective plurality of super word lines. Each super word line may include a respective plurality of word lines. Each word line may correspond to at least one logical block address.

The controller 202 may also be configured to generate (706) a table for storing the plurality of logical block addresses. In some aspects, the controller 101 may be configured to generate the table by creating a list of entries. Each entry may correspond to a respective logical block address of the plurality of logical block addresses, and each entry may include a number of LBAs for (e.g., starting with or following) the respective logical block address. An example table 300 is described above in reference to FIG. 3, according to some embodiments.

The controller 101 may also be configured to receive (708) an update to one or more LBAs of the one or more data blocks. The controller 101 may also be configured to: in response (710) to receiving the update: defragment (712) at least one data block of the one or more data blocks, based on the one or more LBAs; and write (714) data for one or more super word lines of the at least one data block to a new data block in the device memory, based on the table.

In some aspects, the controller 101 may be further configured to write data for the one or more super word lines in a same order as logical block addresses in the table.

In some aspects, the controller 101 may be configured to: receive a plurality of streams of data from the host system, each stream of data corresponding to a respective plurality of logical block addresses; and generate a plurality of tables, each table corresponding to a respective stream of data, and each table configured to store the respective plurality of logical block addresses; and in response to receiving the update, select the table from the plurality of tables based on the one or more LBAs. For example, a plurality of tables, similar to the table described above in reference to FIG. 3, may be generated. Each table may correspond to a different stream.

In some aspects, the controller 101 may be further configured to select the at least one data block from the one or more data blocks based on a number of LBAs of the one or more LBAs and a size of the at least one data block. For example, in FIG. 4, block A may be selected over block B.

In some aspects, the controller 101 may be further configured to select the one or more super word lines based on a number of LBAs of the one or more LBAs and a size of the at least one data block. For example, in FIG. 4, the super word line containing the LBAs 32, 37, 38 and 29, may be selected over the super word line containing the LBAs 208, 209, 210, 211 and 215.

In some aspects, at least one LBA of the one or more LBAs corresponds to a different super word line than other LBAs of the one or more LBAs. For example, in FIG. 4, the LBAs 4 and 5 correspond to a different super word line than the LBAs 102 and 104.

In some aspects, each LBA of the one or more LBAs corresponds to a same super word line of the at least one data block. Although a specific example is not shown in the drawings, an incoming write can correspond to any one super word line, without straddling super word lines.

In some aspects, the controller 101 may be further configured to: prior to defragmenting the at least one data block, initially write data corresponding to the one or more LBAs to a temporary data block that is distinct from the one or more data blocks; and write data for the one or more super word lines from the temporary data block to the new data block in the device memory, based on the table.

In some aspects, the controller 101 may be further configured to: in response to receiving the update: in accordance with a determination that a number of LBAs of the one or more LBAs is above a predetermined threshold: write data for all super word lines of the at least one data block to the new data block in the device memory, based on the table. An example for a full defragmentation is described above in reference to FIG. 6, according to some embodiments.

Various examples of aspects of the disclosure are described below. These are provided as examples, and do not limit the subject technology.

One or more aspects of the subject technology provide a data storage device that may include a host interface, a device memory and a controller. The host interface may couple the data storage device to a host system. The controller may be configured to receive a stream of data from the host system via the host interface. The stream of data corresponds to a plurality of logical block addresses. The controller may be configured to write the stream of data to one or more data blocks in the device memory. Each data block may include a respective plurality of super word lines. Each super word line may include a respective plurality of word lines. Each word line may correspond to a logical block address. The controller may also be configured to generate a table for storing the plurality of logical block addresses. The controller may also be configured to receive an update to one or more word lines of the one or more data blocks. The controller may also be configured to: in response to receiving the update: defragment at least one data block of the one or more data blocks, based on the one or more word lines; and write data for one or more super word lines of the at least one data block to a new data block in the device memory, based on the table.

In some aspects, the controller may be configured to generate the table by creating a list of entries. Each entry may correspond to a respective logical block address of the plurality of logical block addresses, and each entry may include a number of word lines for the respective logical block address.

In some aspects, the controller may be further configured to write data for the one or more super word lines in a same order as logical block addresses in the table.

In some aspects, the controller may be configured to: receive a plurality of streams of data from the host system, each stream of data corresponding to a respective plurality of logical block addresses; and generate a plurality of tables, each table corresponding to a respective stream of data, and each table configured to store the respective plurality of logical block addresses; and in response to receiving the update, select the table from the plurality of tables based on the one or more word lines.

In some aspects, the controller may be further configured to select the at least one data block from the one or more data blocks based on a number of word lines of the one or more word lines and a size of the at least one data block.

In some aspects, the controller may be further configured to select the one or more super word lines based on a number of word lines of the one or more word lines and a size of the at least one data block.

In some aspects, at least one word line of the one or more word lines corresponds to a different super word line than other word lines of the one or more word lines.

In some aspects, each word line of the one or more word lines corresponds to a same super word line of the at least one data block.

In some aspects, the controller may be further configured to: prior to defragmenting the at least one data block, initially write data corresponding to the one or more word lines to a temporary data block that is distinct from the one or more data blocks; and write data for the one or more super word lines from the temporary data block to the new data block in the device memory, based on the table.

In some aspects, the controller may be further configured to: in response to receiving the update: in accordance with a determination that a number of word lines of the one or more word lines is above a predetermined threshold: write data for all super word lines of the at least one data block to the new data block in the device memory, based on the table.

In other aspects, methods are provided for stream data management in data storage devices. According to some aspects, a method may be implemented using one or more controllers for one or more data storage devices. The method may include receiving a stream of data from a host system via a host interface. The stream of data corresponds to a plurality of logical block addresses. The method may also include writing the stream of data to one or more data blocks in a device memory. Each data block may include a respective plurality of super word lines. Each super word line may include a respective plurality of word lines. Each word line may correspond to a logical block address. The method may also include generating a table for storing the plurality of logical block addresses. The method may also include receiving an update to one or more word lines of the one or more data blocks. The method also include, in response to receiving the update: defragmenting at least one data block of the one or more data blocks, based on the one or more word lines; and writing data for one or more super word lines of the at least one data block to a new data block in the device memory, based on the table.

In some aspects, the method further includes generating the table by creating a list of entries, each entry corresponding to a respective logical block address of the plurality of logical block addresses, and each entry including a number of word lines for the respective logical block address.

In some aspects, the method further includes writing data for the one or more super word lines in a same order as logical block addresses in the table.

In some aspects, the method further includes: receiving a plurality of streams of data from the host system, each stream of data corresponding to a respective plurality of logical block addresses; and generating a plurality of tables, each table corresponding to a respective stream of data, and each table configured to store the respective plurality of logical block addresses; and in response to receiving the update, selecting the table from the plurality of tables based on the one or more word lines.

In some aspects, the method further includes selecting the at least one data block from the one or more data blocks based on a number of word lines of the one or more word lines and a size of the at least one data block.

In some aspects, the method further includes selecting the one or more super word lines based on a number of word lines of the one or more word lines and a size of the at least one data block.

In some aspects, at least one word line of the one or more word lines corresponds to a different super word line than other word lines of the one or more word lines.

In some aspects, each word line of the one or more word lines corresponds to a same super word line of the at least one data block.

In some aspects, the method further includes: in response to receiving the update: in accordance with a determination that a number of word lines of the one or more word lines is above a predetermined threshold: writing data for all super word lines of the at least one data block to the new data block in the device memory, based on the table.

In further aspects, a system may include a means for receiving a stream of data from a host system via a host interface. The stream of data corresponds to a plurality of logical block addresses. The system may also include a means for writing the stream of data to one or more data blocks in a device memory, each data block comprising a respective plurality of super word lines, each super word line comprising a respective plurality of word lines, each word line corresponding to a logical block address. The system may also include a means for generating a table for storing the plurality of logical block addresses. The system may also include means for receiving an update to one or more word lines of the one or more data blocks. The system may also include a means for responding to receiving the update. The system may also include a means for defragmenting at least one data block of the one or more data blocks, based on the one or more word lines. The system may also include a means for writing data for one or more super word lines of the at least one data block to a new data block in the device memory, based on the table.

Disclosed are systems and methods providing efficient stream data management. Thus, the described methods and systems provide performance benefits that improve the functioning of a storage device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   a host interface for coupling the data storage device to a host system;
   a device memory; and
   a controller configured to:
      receive a stream of data from the host system via the host interface, wherein the stream of data corresponds to a plurality of logical block addresses;
      write the stream of data to one or more data blocks in the device memory, each data block comprising a respective plurality of super word lines, each super word line comprising a respective plurality of word lines, each word line corresponding to at least one logical block address;
      generate a table for storing the plurality of logical block addresses;
      receive an update to one or more logical block addresses of the one or more data blocks; and
      in response to receiving the update:
         defragment at least one data block of the one or more data blocks, based on the one or more logical block addresses; and
         write data for one or more super word lines of the at least one data block to a new data block in the device memory, based on the table,
   wherein the controller is configured to:
      receive a plurality of streams of data from the host system, each stream of data corresponding to a respective plurality of logical block addresses;
      generate a plurality of tables, each table corresponding to a respective stream of data, each table configured to store the respective plurality of logical block addresses; and
      in response to receiving the update, select the table from the plurality of tables based on the one or more logical block addresses.

2. The data storage device of claim 1, wherein the controller is configured to:
   generate the table by creating a list of entries, each entry corresponding to a respective logical block address of the plurality of logical block addresses, and each entry including a number of logical block addresses for the respective logical block address.

3. The data storage device of claim 1, wherein the controller is configured to:
   write data for the one or more super word lines in a same order as logical block addresses in the table.

4. The data storage device of claim 1, wherein the controller is further configured to:
   select the at least one data block from the one or more data blocks based on a number of logical block addresses of the one or more logical block addresses and a size of the at least one data block.

5. The data storage device of claim 1, wherein the controller is further configured to:
   select the one or more super word lines based on a number of logical block addresses of the one or more logical block addresses and a size of the at least one data block.

6. The data storage device of claim 1, wherein at least one logical block address of the one or more logical block addresses corresponds to a different super word line than other word lines of the one or more logical block addresses.

7. The data storage device of claim 1, wherein each logical block address of the one or more logical block addresses corresponds to a same super word line of the at least one data block.

8. The data storage device of claim 1, wherein the controller is further configured to:
   prior to defragmenting the at least one data block, initially write data corresponding to the one or more logical block addresses to a temporary data block that is distinct and different from the one or more data blocks; and
   write data for the one or more super word lines from the temporary data block to the new data block in the device memory, based on the table.

9. The data storage device of claim 1, wherein the controller is further configured to:
   in response to receiving the update:
      in accordance with a determination that a number of logical block addresses of the one or more logical block addresses is above a predetermined threshold:
         write data for all super word lines of the at least one data block to the new data block in the device memory, based on the table.

10. A method implemented using one or more controllers for one or more data storage devices, the method comprising:
   receiving a stream of data from a host system via a host interface, wherein the stream of data corresponds to a plurality of logical block addresses;
   writing the stream of data to one or more data blocks in a device memory, each data block comprising a respective plurality of super word lines, each super word line comprising a respective plurality of word lines, each word line corresponding to at least one logical block address;
   generating a table for storing the plurality of logical block addresses;
   receiving an update to one or more logical block addresses of the one or more data blocks; and
   in response to receiving the update:
      defragmenting at least one data block of the one or more data blocks, based on the one or more logical block addresses; and
      writing data for one or more super word lines of the at least one data block to a new data block in the device memory, based on the table,
   wherein the at least one data block is selected from the one or more data blocks based on a number of logical block addresses of the one or more logical block addresses and a size of the at least one data block.

11. The method of claim 10, further comprising:
generating the table by creating a list of entries, each entry corresponding to a respective logical block address of the plurality of logical block addresses, and each entry including a number of logical block addresses for the respective logical block address.

12. The method of claim 10, further comprising:
writing data for the one or more super word lines in a same order as logical block addresses in the table.

13. The method of claim 10, further comprising:
receiving a plurality of streams of data from the host system, each stream of data corresponding to a respective plurality of logical block addresses; and
generating a plurality of tables, each table corresponding to a respective stream of data, and each table configured to store the respective plurality of logical block addresses; and
in response to receiving the update, selecting the table from the plurality of tables based on the one or more logical block addresses.

14. The method of claim 10, further comprising:
selecting the one or more super word lines based on a number of logical block addresses of the one or more logical block addresses and a size of the at least one data block.

15. The method of claim 10, wherein at least one logical block address of the one or more logical block addresses corresponds to a different super word line than other logical block addresses of the one or more logical block addresses.

16. The method of claim 10, wherein each logical block address of the one or more logical block addresses corresponds to a same super word line of the at least one data block.

17. The method of claim 10, further comprising:
in response to receiving the update:
in accordance with a determination that a number of logical block addresses of the one or more logical block addresses is above a predetermined threshold:
writing data for all super word lines of the at least one data block to the new data block in the device memory, based on the table.

18. A system, comprising:
means for receiving a stream of data from a host system via a host interface, wherein the stream of data corresponds to a plurality of logical block addresses;
means for writing the stream of data to one or more data blocks in a device memory, each data block comprising a respective plurality of super word lines, each super word line comprising a respective plurality of word lines, each word line corresponding to at least one logical block address;
means for generating a table for storing the plurality of logical block addresses;
means for receiving an update to one or more logical block addresses of the one or more data blocks; and
means for, in response to receiving the update:
defragmenting at least one data block of the one or more data blocks, based on the one or more logical block addresses; and
writing data for one or more super word lines of the at least one data block to a new data block in the device memory, based on the table,
wherein the one or more super word lines are for being selected based on a number of logical block addresses of the one or more logical block addresses and a size of the at least one data block.

* * * * *